Figure 1:
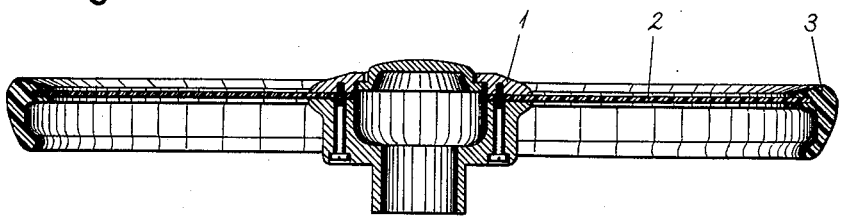

July 13, 1954            L. SCHMID            2,683,383

SAFETY STEERING WHEEL FOR MOTOR-DRIVEN VEHICLES

Filed Oct. 18, 1949            4 Sheets-Sheet 1

INVENTOR
LEOPOLD SCHMID
BY Haseltine, Lake & Co.
AGENTS

July 13, 1954            L. SCHMID            2,683,383
SAFETY STEERING WHEEL FOR MOTOR-DRIVEN VEHICLES
Filed Oct. 18, 1949            4 Sheets-Sheet 2
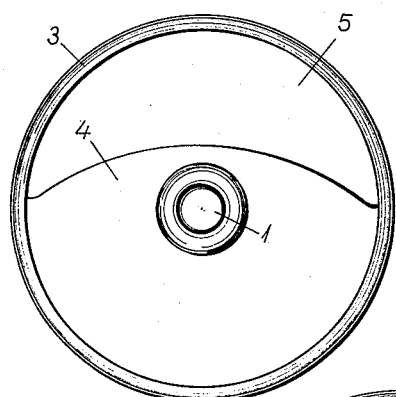
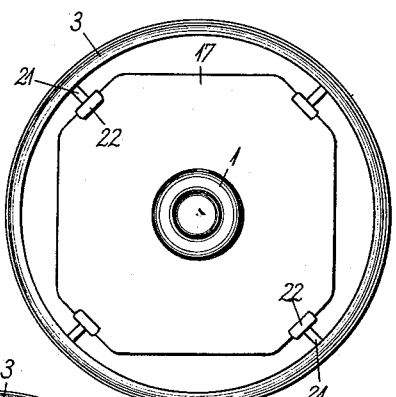
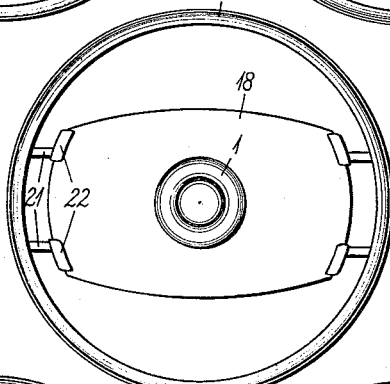
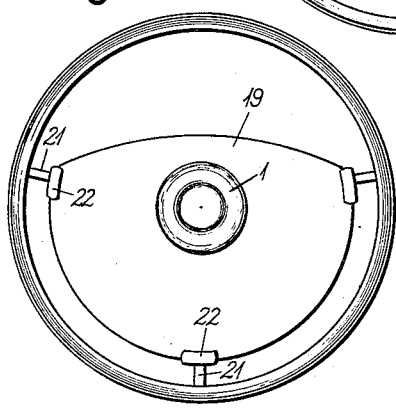
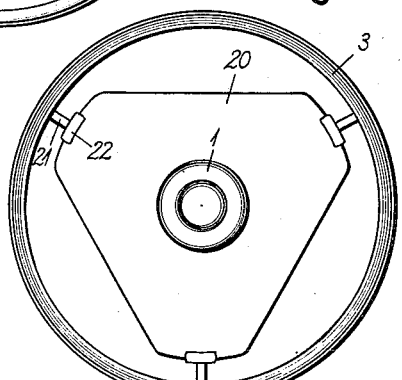
INVENTOR
LEOPOLD SCHMID
By:
Haseltine, Lake & Co.
AGENTS July 13, 1954   L. SCHMID   2,683,383
SAFETY STEERING WHEEL FOR MOTOR-DRIVEN VEHICLES
Filed Oct. 18, 1949   4 Sheets-Sheet 3
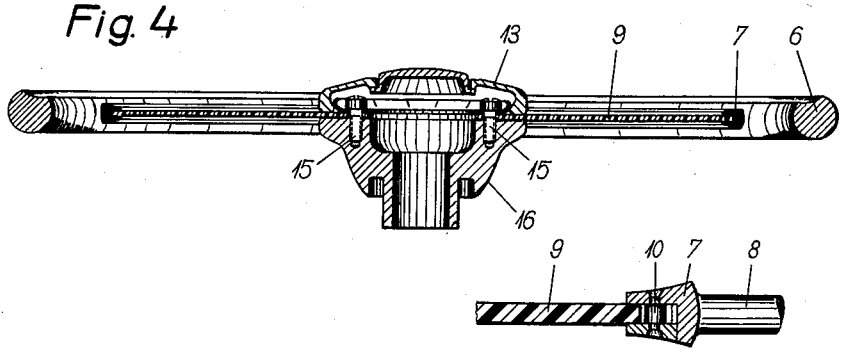
Fig. 4
Fig. 4a
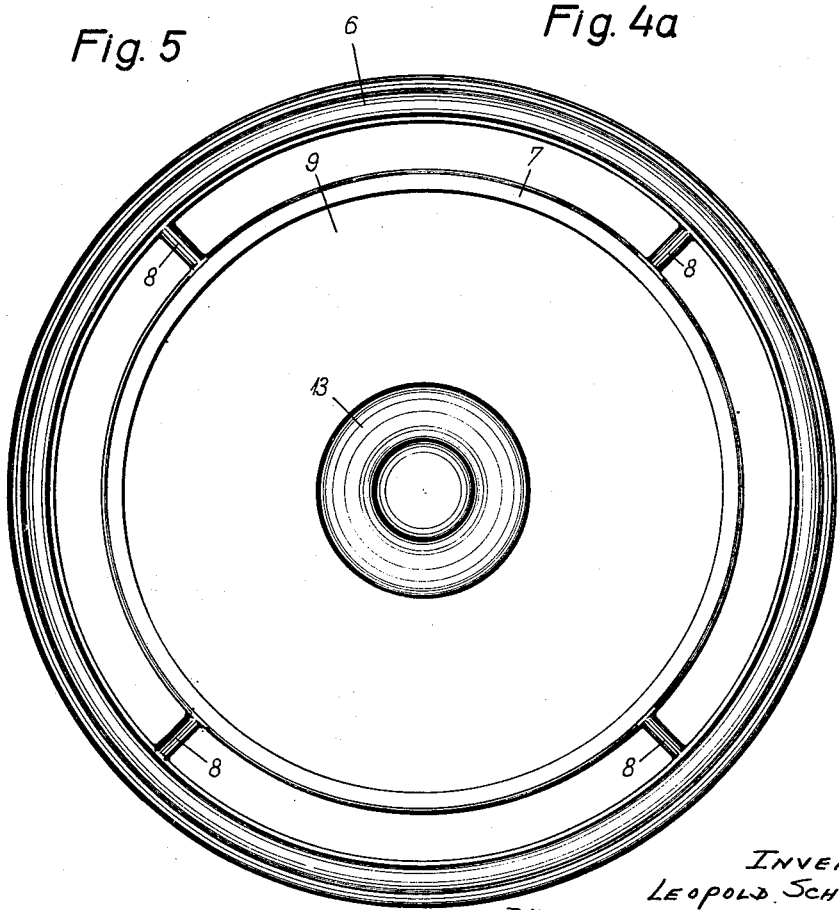
Fig. 5
INVENTOR
LEOPOLD SCHMID
BY:
Haseltine, Lake & Co.
AGENTS July 13, 1954 L. SCHMID 2,683,383
SAFETY STEERING WHEEL FOR MOTOR-DRIVEN VEHICLES
Filed Oct. 18, 1949 4 Sheets-Sheet 4

INVENTOR
LEOPOLD SCHMID
By: Haseltine, Lake & Co.
AGENTS

Patented July 13, 1954

2,683,383

UNITED STATES PATENT OFFICE 2,683,383

SAFETY STEERING WHEEL FOR MOTOR-DRIVEN VEHICLES

Leopold Schmid, Gmund, Carinthia, Austria

Application October 18, 1949, Serial No. 121,961

Claims priority, application Austria February 17, 1949

8 Claims. (Cl. 74—552)

The efforts in the construction of motor driven vehicles are especially directed to increasing as much as possible the safety of those vehicles, because the number of accidents is very high. The American medical report "Medical criticism of modern automotive engineering" published in the Journal of the American Medical Association of October 30, 1948, exclusively deals with these endeavours concerning greater safety. An essential part for the question of the driver's safety concerns the construction of the steering wheel, for which the physicians are suggesting a yielding hydraulically stemmed steering column, which is automatically pressed together by the pressure caused by the driver being thrown against it.

The steering wheels themselves were hitherto filled in, as a rule, by spokes connecting the hub of the steering wheel with the rim of the wheel. The construction of the spokes, their number and arrangement are differing to a great extent. Thus the spokes were made of spring steel with a flat or round cross section, in order to prevent by the elasticity of said spokes the driver as much as possible from getting injured in the case of a collision, though it was not even then possible thereby to prevent the driver from getting considerably injured. The primary object of the invention is to produce a steering wheel offering great safety against injuries during collisions. A further object of the invention is to attain as good a view as possible of the instruments arranged behind the safety steering wheel, which instruments must be watched during the drive. For this purpose the production of the wheel with four spokes was dropped in favor of the wheel with three spokes, whereby the spokes were arranged asymmetrically, in such a way that two of the same are in an essentially horizontal position during a straight drive, in order possibly to release the vista to the instrument board. During the drive with a turned around steering wheel the view of the instrument board through the spokes is, however, hindered. Moreover, the fact that the connection from the safety steering wheel to the steered wheels is carried out by means of a great number of parts results in most cases in that the position desired of the steering wheel is subject to deviations, so that even during a straight drive there is not always given an unhindered view to the instruments. The view through the spokes, especially with a turned around safety steering wheel, is markedly hindered even with the newer constructions of the bodies, where the instruments are assembled directly behind the level of the steering wheel in a casing fixed upon the steering column, in order to tire the driver less, especially during a long drive, by the instruments being placed nearer to the eyes. Furthermore, steering wheels are known with only two spokes, which should be during a straight run of the car in horizontal position, said wheels being, however, disadvantageous and enabling likewise only in horizontal position the unimpeded view to the instruments. Finally, a natural limit is reached when spokes are being used with the endeavour of creating with the least possible expenditure of weight a shapely steering wheel, since especially with steering wheels with a small number of spokes and an asymmetric distribution a relatively strong, and therefore heavy steel armouring of the rim is required.

The invention aims at removing all the drawbacks resulting from the use of spokes for steering wheels, and essentially consists in that the connection from the hub of the steering wheel to the rim of the same is formed by a disc of a transparent material, possibly provided with cuttings or recesses. As a transparent material artificial resin and especially Plexiglas may be used. This embodiment of the steering wheel increases the safety against accidents, gives a free view to the instruments, and enables a small expenditure of weight. By the use of the relatively thin disc, e. g. of transparent artificial resin, the danger of getting injured in accidents is very much decreased, since such discs are able to take up considerable forces in the direction of the circumference by a simultaneous elasticity, and in the case of a collision injuries, which the driver being thrown forward may suffer by yielding spokes of steel, are very improbable even is the disc consisting of an amorphous mass should be broken. Furthermore, the best possible view to the instrument board, or to the instruments fixed upon the steering column, through the transparent disc clear as glass is ensured in any position, and finally at a smallest possible expenditure of weight the most pleasing shape possible is attainable by the use of transparent artificial resin or the like. The very low specific weight of the transparent material of the disc is extraordinarily aiding the light manner of building. The modern effects actually attainable, if Plexiglas is used, finally ensure a pleasing look of the safety steering wheel.

Figure 2:
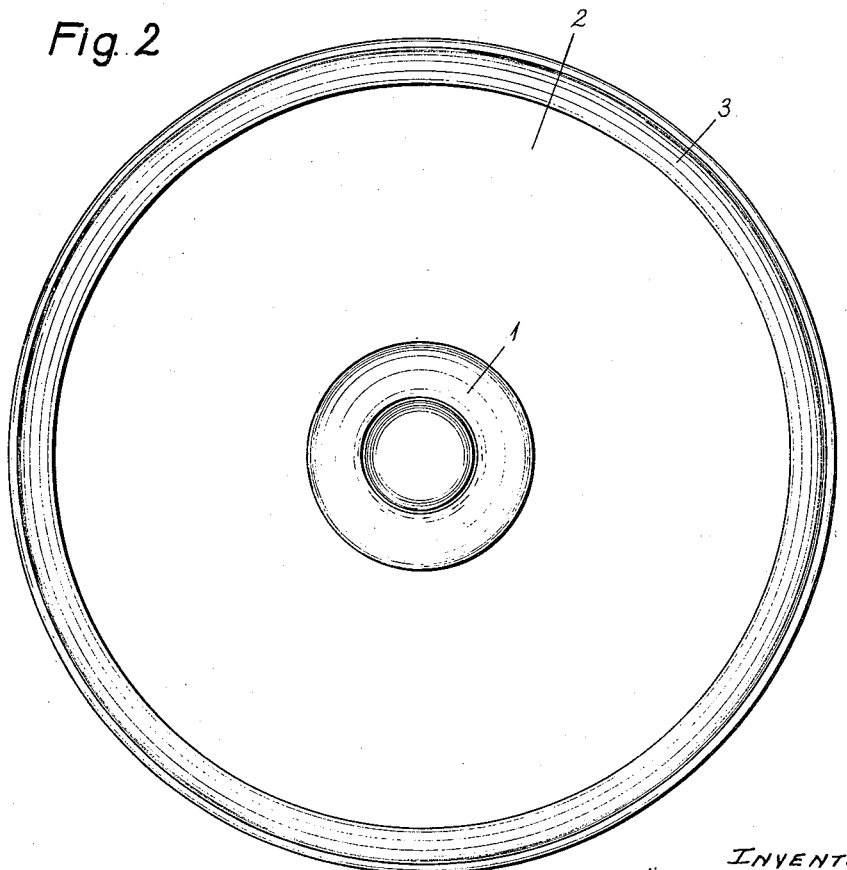
Figure 6:
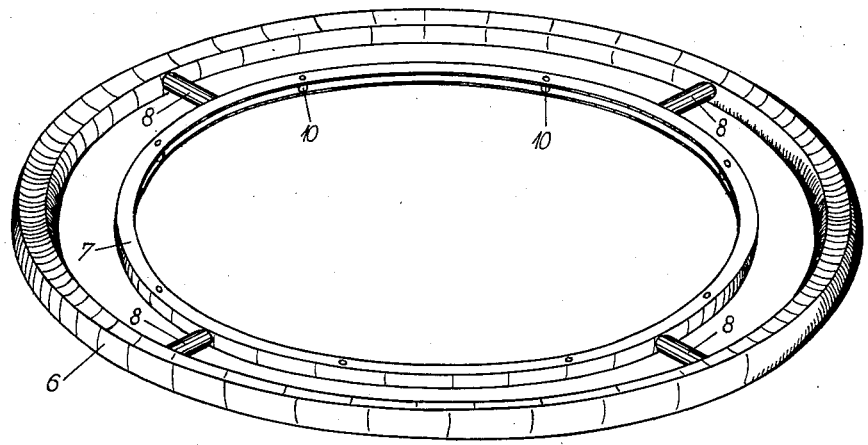
Figure 7:
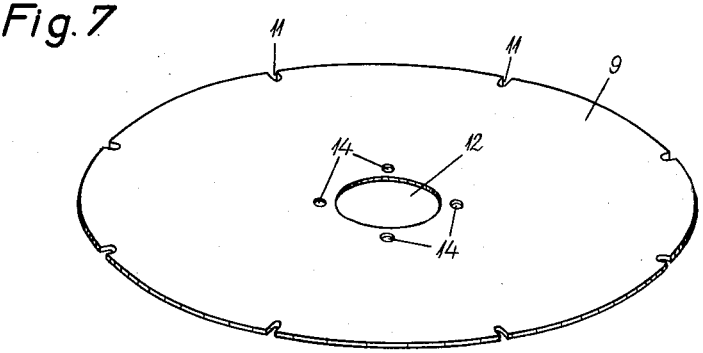
Figure 8:
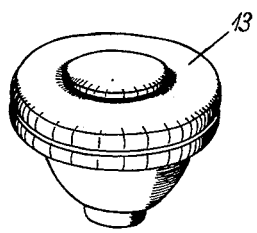

Some embodiments of the invention are shown, by way of example, in the accompanying drawings, in which:

Figs. 1 and 2 show a cross section and a top view of one embodiment, Fig. 3 a top view of a modified embodiment. A further embodiment is shown in the Figs. 4 to 8, wherein Fig. 4 shows a cross section, Fig. 4a a detail in cross section of Fig. 6, Fig. 5 a top view and the Figs. 6 to 8 the individual parts of the steering wheel diagrammatically one below the other. Figs. 9 to 12 show top views of four further variations of the subject of the invention.

According to Figs. 1 and 2 the hub 1 of the safety steering wheel is connected to the rim 3 of the wheel by the full disk 2 of transparent material, especially Plexiglas. Said disc may also be made of one piece with the rim of the steering wheel. The special profile of the rim 3 in Fig. 1 used in this case makes it possible to hold said rim well—despite the impossibility of fully grasping it with the hand. The embodiment according to Fig. 3 is similar to that according to Figs. 1 and 2, the transparent disc 4 extending, however, only over one part of the surface between the hub of the steering wheel and the rim of the wheel, so that a recess 5 is left free, in order that the rim of the steering wheel may be fully grasped with the hand. Naturally, there may also be left open several smaller recesses. The profile of the rim of the steering wheel is suitably proportionated in such a way that the part extending from the disc 2 downwards is more than twice as high as the part of the rim of the steering wheel extending upwards.

A favoured embodiment is the one according to Figs. 4 to 8. The rim of the steering wheel comprises two parts 6, 7 rigidly connected with each other by the cross pieces or bolts 8. The outside part 6 of the rim of the wheel is the customary one for being grasped by the driver with his hand, whereas the inside part or ring 7 of the rim of the wheel serves as a frame for the transparent disc 9. Said ring 7 is in its cross section formed as a U, and shows pins 10 (Fig. 4a) distributed over its circumference engaging recesses 11 (Fig. 7) at the circumference of the disc 9, and serving as coupling means, as well as for centering the disc. In the center of disc 9 a round opening 12 is provided for inserting the motor-horn contact not represented. Through the bore holes 14 the disc is held fast by means of screws 15 at the lower part 16 of the hub connected with the steering column. Since Plexiglas, of which the disc preferably consists, expands to a greater degree than the ring of the rim of the safety steering wheel consisting of steel, an expansion joint between the circumference of the disc and the corresponding inside circumference of the ring 7 is left open.

Further variations of steering wheels are shown in Figs. 9 to 12 according to which discs 17, 18, 19, and 20, respectively, are provided deviating from the round shape, said discs being connected with the rim 23 of the steering wheel instead of by a ring by holders 22 resting on the cross bolt 21.

While the invention has been shown in the particular embodiment described it is not limited thereto, as modifications thereof may be made without departing from the scope of the appended claims.

I claim:

1. Safety steering wheel for motor-driven vehicles, comprising a hub for connecting said wheel with the steering column of the vehicle, a disc of transparent and splinter-proof material connected with the outer edge portion of said hub and adapted to transfer steering torque, a rim of said wheel, and short stiff holders, said disc extending to said holders and said holders being connected with said disc and with said rim.

2. Safety steering wheel as claimed in claim 1, comprising an intermediate ring which is connected with said disc and said holders.

3. Safety steering wheel as claimed in claim 1, wherein said disc has some other than a round shape.

4. Safety steering wheel as claimed in claim 1, wherein said disc has an essentially triangular shape and said short stiff holders are connected with said disc at its corners.

5. Safety steering wheel for motor-driven vehicles, comprising a hub for connecting said wheel with the steering column of the vehicle, a disc of transparent, resilient and splinter-proof material connected with the outer edge portion of said hub and adapted to transfer steering torque, a rim of said wheel, and short stiff holders, said disc extending to said holders and said holders being connected with said disc and with said rim.

6. Safety steering wheel as claimed in claim 5, comprising an intermediate ring which is connected with said disc and said holders.

7. Safety steering wheel as claimed in claim 5, wherein said disc has some other than a round shape.

8. Safety steering wheel as claimed in claim 5, wherein said disc has an essentially triangular shape and said short stiff holders are connected with said disc at its corners.

References Cited in the file of this patent

UNITED STATES PATENTS

| Number | Name | Date |
| --- | --- | --- |
| D. 139,508 | Snow | Nov. 21, 1944 |
| 1,484,893 | Lobdell | Feb. 26, 1924 |
| 1,547,801 | Garrett | July 28, 1925 |
| 1,720,142 | O'Connor | July 9, 1929 |
| 2,106,989 | Truesdale | Feb. 1, 1938 |
| 2,138,163 | Harris | Nov. 29, 1938 |
| 2,155,101 | Schnell | Apr. 18, 1939 |

FOREIGN PATENTS

| Number | Country | Date |
| --- | --- | --- |
| 434,231 | Great Britain | Aug. 28, 1935 |